Patented Mar. 5, 1946

2,395,879

UNITED STATES PATENT OFFICE 2,395,879

CYANINE DYESTUFFS

John David Kendall and Douglas James Fry, Ilford, England, assignors to Ilford Limited, Ilford, England, a British company No Drawing. Application March 5, 1941, Serial No. 381,926. In Great Britain April 19, 1940

8 Claims. (Cl. 260—240)

This invention relates to the production of dyestuffs and particularly to the production of dyestuffs capable of optically sensitising silver halide photographic emulsions and of dyeing textile materials.

In our application No. 381,925, filed on even date herewith, there is described a process for preparing dyestuffs and dyestuff intermediates which comprises condensing together two molecules of a heterocyclic keto methylene compound of the general formula:

(I) 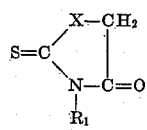

where $R_1$ is a hydrogen atom or hydrocarbon group and X is an oxygen or sulphur atom, in the presence of an anhydride of a monocarboxylic acid or an ortho ester of a monocarboxylic acid, and in the presence of a strong base, i. e., a base stronger than ammonia.

The products of this process have the general formula:

(II) 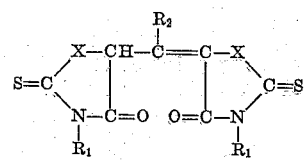

and thus contain two thione groupings each in the $\alpha$ position to a heterocyclic nitrogen atom ($R_2$ in this formula is a hydrogen atom or hydrocarbon group).

In our application No. 186,251, filed January 2, 1938, we have described a process in which photographic sensitising dyestuffs are produced by condensing certain types of compounds containing a rhodanic acid nucleus with an alkyl salt to convert the thione grouping of the rhodanic acid nucleus into a reactive group, and condensing the resulting compound with one of seven types of compounds which are set forth in the specification.

It has now been discovered that the above compounds of Formula II which contain two rhodanic acid nuclei may be condensed with alkyl and aralkyl salts and with the seven types of compound set forth in application No. 186,251 to produce photographic sensitising dyestuffs.

According to the present invention, therefore, dyestuffs are produced by reacting a compound of the general Formula II with an alkyl or aralkyl salt to convert the thione grouping into a reactive group and condensing the resulting compound with one of the following types of compounds.

(a) A five-membered ring compound containing the system:

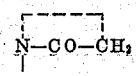

(b) A quaternary salt of a heterocyclic nitrogen compound having a reactive methyl group or external methylene group or N-reactive amino or imino group in the $\alpha$ or $\gamma$ position to a heterocyclic nitrogen atom (c) A compound containing the grouping:

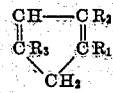

where $R_1$, $R_2$ and $R_3$ may be alkyl, aryl or aralkyl groups or $R_1$ and $R_2$ may be part of the same arylene ring.

(d) Carbocyclic compounds containing a keto methylene group (e) Acids or esters of the type:

where X is hydrogen or a mono-valent substituent, R is hydrogen or an alkyl or similar group and $n$ is 0 or 1

(f) Anhydrides of acids of the general formula:

$$CH_3-(CX)_{2n-1}=CH-COOH$$

where X is hydrogen or a monovalent grouping, and $n$ is 1 or 2.

(g) Ammonia or amidines or hydrazines or diamines or their salts.

The foregoing compounds (a) to (g) are characterised by the fact that they all contain a reactive $CH_2$ group or a reactive NH group.

According to a further feature of the invention, when the five-membered ring compounds containing the system

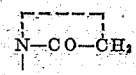

which are condensed with the quaternary salt of the compounds of Formula II correspond to the general formula:

(R being a hydrogen atom or a hydrocarbon group.) The resulting product contains thione groupings and so may be treated with an alkyl or aralkyl salt and condensed with any of the compounds (a) to (g) enumerated above, i. e., the process of the invention may be repeated to add further groups to the product.

When this second condensation is with a five-membered ring compound containing the system:

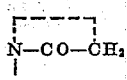

which also corresponds to the general formula:

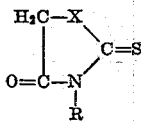

(R being a hydrogen atom or a hydrocarbon group.) The product will once more contain thione groupings, and by proceeding in this way the condensation may be repeated as often as desired; the final product obtained by any such series of condensations may be further condensed according to the invention with any of the other types of compound (b) to (g) above to give a dyestuff comprising two nuclear groups, for example, heterocyclic nitrogen nuclei, linked by a chain of any desired number of keto-thiazoline or keto-oxazoline rings, which chain may also include other rings such as cyclopentadiene rings or methine groups or nitrogen atoms according to the condensation carried out.

It is believed that in the first part of the process the thione group is converted into a reactive thioether grouping which may then react with any of the other groupings (a) to (g).

The condensation may be carried out by first carrying out the reaction with the alkyl or aralkyl salt and then reacting the resulting compound with the other compounds (a) to (g) or in the case where quaternary salts of heterocyclic nuclei are employed, the two heterocyclic bases may be fused together with the alkyl salt and the reaction completed by heating in the presence of an acid binding substance, for example, pyridine, as described in British Patent No. 438,420.

Examples of the compounds of type (a) which may be condensed with the compounds of Formula II according to our invention are those enumerated in the specification of British Patent No. 426,718, filed October 3, 1933, namely, oxindoles, pyrazole-5-ones, hydantoin, thiohydantoin, ψ-hydantoin, ψ-thio-hydantoin.

Compounds of type (b) which may be employed may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines; diazines; such as pyrimidines and quinazolines; diazoles (e. g., thio-ββ'diazole) oxazolines, thiazolines and selenazolines. The polycyclic compounds of these series may also be substituted in the carboxylic rings with one or more groups such as alkyl, aryl, amino, hydroxy, alkoxy and methylene dioxy groups. Examples of compounds of type (c) which may be employed are, for example, cyclopentadiene and indene and their substitution derivatives. Compounds of type (d) which may be employed are exemplified by 1.3-indane-dione and the hydrindones whilst examples of compounds of type (e) which may be employed are malonic acid and glutaconic acid. A compound of type (f) is crotonic anhydride, whilst compounds of type (g) are ammonium salts such as ammonium nitrate, hydrazines and substituted hydrazines.

The dyestuffs produced in accordance with the present invention are sensitisers for photographic silver halide emulsions and the invention also includes photographic silver halide emulsions sensitised with the dyestuffs produced in accordance with the present invention.

The invention is illustrated by the following specific examples:

*Example 1*

A dyestuff was prepared by the following method: 0.80 gm. of (2-thio-3-methyl-4-ketotetrahydrothiazolyl - 5)-(2'-thio-3'-methyl-4'-keto - tetrahydrothiazolylidene-5')-mesomethyl methane, 1.49 gms. of 1-methylbenzthiazole and 5 gms. of ethyl-p-toluene sulphonate were mixed together and fused for 2½ hours at 160° C. 10 ccs. of pyridine were added and the mixture warmed on a water bath and gently refluxed for 25 minutes. The mixture was then poured into a beaker, and cooled. The product crystallised out and on recrystallisation from methyl alcohol, had a melting point of 280° C. with decomposition. Its probable formula is:

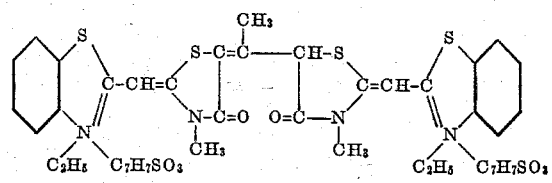

This dyestuff, incorporated in a silver iodobromide emulsion, extends the sensitivity to about 6600 Å.

*Example 2*

A dyestuff was prepared by a method analogous to that of Example 1 employing 4.5 gms. of methyl-p-toluene sulphonate instead of ethyl-p-toluene sulphonate. The product on recrystallisation had a melting point of 280° C. with decomposition. Its probable formula is:

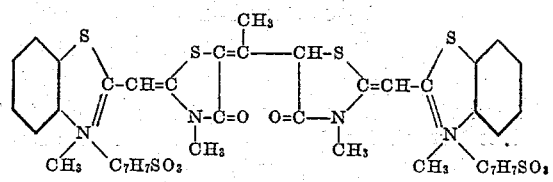

*Example 3*

A dyestuff was prepared by the following method: 0.85 gm. of (2-thio-3-ethyl-4-keto-tetrahydrothiazolyl-5)-(2'-thio-3'-ethyl-4'- keto - tetrahydrothiazolylidene-5')-meso methyl methane, 1.49 gms. of 1-methylbenzthiazole and 5 gms. of ethyl-p-toluene sulphonate were fused for ¾ hour at 150° C. 10 ccs. of pyridine were then added and the mixture refluxed for 10 minutes. The mixture was then poured into a beaker and allowed to cool. It was diluted with water and a solution of potassium iodide was added. The product on recrystallisation from methyl alcohol had a melting point of 275° C. with decomposition. Its probable formula is:

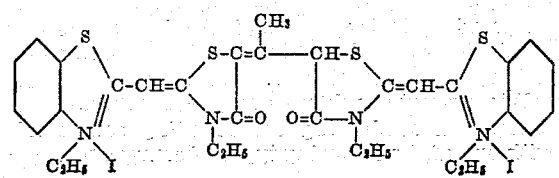

This dyestuff, incorporated in a silver iodobromide emulsion, extends the sensitivity to about 7200 Å.

Example 4

A dyestuff was prepared by the following method: 0.80 gm. of (2-thio-3-methyl-4-keto-tetrahydrothiazolyl-5)-(2'-thio-3'-methyl-4'-keto-tetrahydrothiazolylidene-5)-meso methyl methane, 1.43 gms. of quinaldine and 4.5 gms. of methyl-p-toluene sulphonate were fused for ½ hour at 150° C. 10 ccs. of pyridine were then added and the mixture refluxed for 30 minutes. The mixture was then poured into a beaker, filtered and the solid material washed with ethyl alcohol. The product was then boiled out with benzene, and then with methyl alcohol. It had a melting point of 271° C. with decomposition.

Its probable formula is:

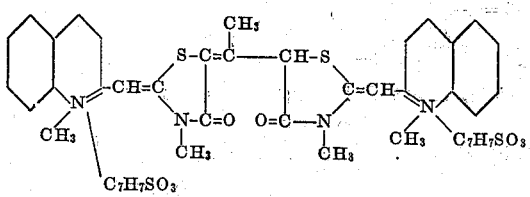

Example 5

A dyestuff was prepared by the following method: 0.80 gm. of (2-thio-3-methyl-4-keto-tetrahydrothiazolyl-5) - (2' - thio - 3' - methyl - 4' - keto-tetrahydrothiazolylidene-5') meso methyl methane, 1.33 gms. of 1-methylbenzoxazole and 4.0 gms. of methyl-p-toluene sulphonate were mixed together and fused for 1½ hours at 150° C. 20 ccs. of pyridine were then added, and the mixture refluxed for half an hour. The mixture was cooled and solid matter separated which was removed by filtration. It was boiled out with 100 ccs. of methyl alcohol. The crystalline product had a melting point of 292° C. with decomposition. Its probable formula is:

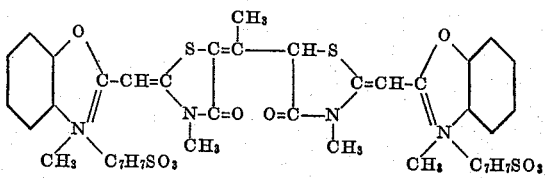

As already indicated, the dyestuffs of this invention are of especial value as sensitisers for gelatino-silver-halide photographic emulsions, e. g. silver chloride, silver bromide, silver chlorobromide and silver iodobromide emulsions. However, they are also of value as textile dyestuffs, e. g. as dyestuffs for cellulose acetate artificial silk.

Textile dye baths formed from the dyestuffs of this invention may be simple solutions of the dyestuffs in water where they are sufficiently soluble. Where the dyestuffs are relatively insoluble they may be employed in the form of dispersions in any of the well known dispersing agents commonly employed in forming dye-baths for cellulose acetate silk, e. g. Turkey red oil, sulphoricinoleic acid, naphthenic acids, sulphonated naphthenic acids, sulphonated naphthalene-formaldehyde condensation products, sulphonated long chain fatty alcohols and similar agents.

The following are examples of the use of the dyestuffs in this connection (the parts referred to are parts by weight).

Example 6

3 parts of the dyestuff of Example 1 were ground to a paste with a little water and then added to a solution of 100 parts of Tergitol IV. The volume of the solution was then adjusted to 3,300 parts by the addition of further water. 110 parts of cellulose acetate fabric were immersed in the dye-bath thus formed and the bath was heated for 30 minutes at 80° C. The fabric was then removed, washed and dried. It was dyed a delicate shade of lavender.

Example 7

The procedure indicated in Example 6 was followed using 3 parts of the dyestuff of Example 2 and 30 parts of Perminal W, making the total bulk to 3,060 parts and dyeing, by means of this bath, 102 parts of cellulose acetate fabric. The fabric was dyed a pale steel-blue shade.

What we claim is:

1. Process for the manufacture of dyestuffs which comprises condensing a compound of the general formula:

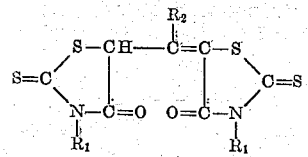

where $R_1$ and $R_2$ are selected from the group consisting of hydrogen atoms and hydrocarbon groups, with a salt selected from the group consisting of alkyl and aralkyl salts and condensing the resulting compound with a quaternary salt of a heterocyclic nitrogen compound having, in a position selected from the $\alpha$ and $\gamma$ positions to the quaternary nitrogen atom, a reactive methylene group.

2. Process for the manufacture of dyestuffs which comprises condensing a compound of the general formula:

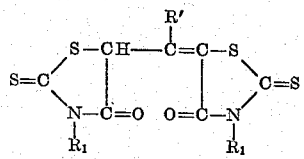

where $R_1$ is selected from the group consisting of a hydrogen atom and a hydrocarbon group, and $R'$ is a hydrocarbon radical, with a quaternizing salt selected from the group consisting of alkyl and aralkyl salts and condensing the resulting compound with a quaternary salt of a heterocyclic nitrogen compound having, in a position selected from the alpha and gamma positions to the quaternary nitrogen atom, a reactive methylene group.

3. A dyestuff of the general formula:

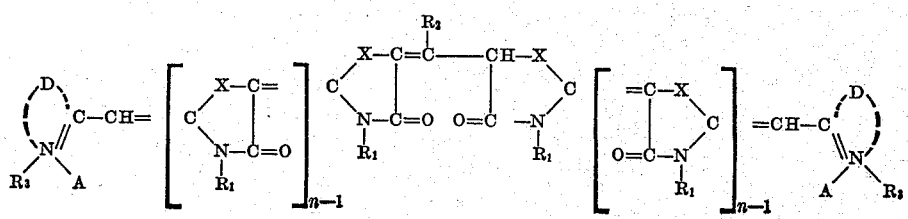

where X is an atom selected from the group consisting of the oxygen atom and the sulphur atom, R1 and R2 are selected from the group consisting of hydrogen atoms and hydrocarbon groups, n is a small positive integer, R3 is selected from the group consisting of alkyl and aralkyl groups, A is an acid residue and D is the residue of a heterocyclic nucleus of the type usual in cyanine dyes.

4. Textile material dyed with a dyestuff as claimed in claim 3.

5. A dyestuff of the general formula:

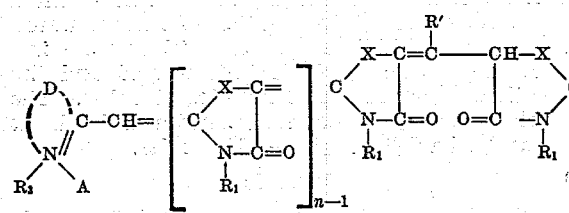

where X is an atom selected from the group consisting of oxygen and sulfur, R1 is selected from the group consisting of a hydrogen atom and a hydrocarbon group, R' is a hydrocarbon radical, R3 is a hydrocarbon group selected from the group consisting of alkyl and aralkyl groups, n is a small positive integer, A is the negative radical of an acid, and D constitutes the atoms necessary to complete a heterocyclic nucleus of the type contained in cyanine dyes.

6. A dyestuff having the formula:

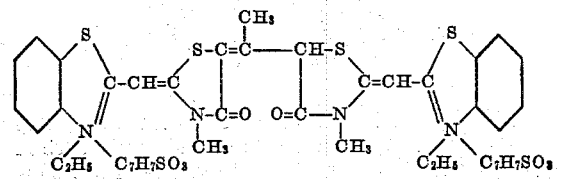

which in the form of crystals melts at 280° C. with decomposition.

7. A dyestuff having the formula:

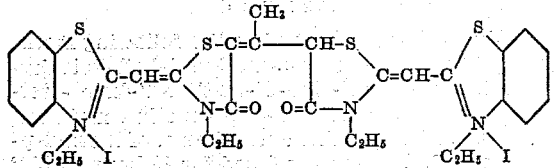

which in the form of crystals melts at 275° C. with decomposition.

8. A dyestuff having the formula:

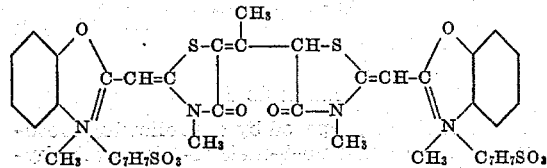

which in the form of crystals melts at 292° C. with decomposition.

JOHN DAVID KENDALL.
DOUGLAS JAMES FRY.